Figure 1:
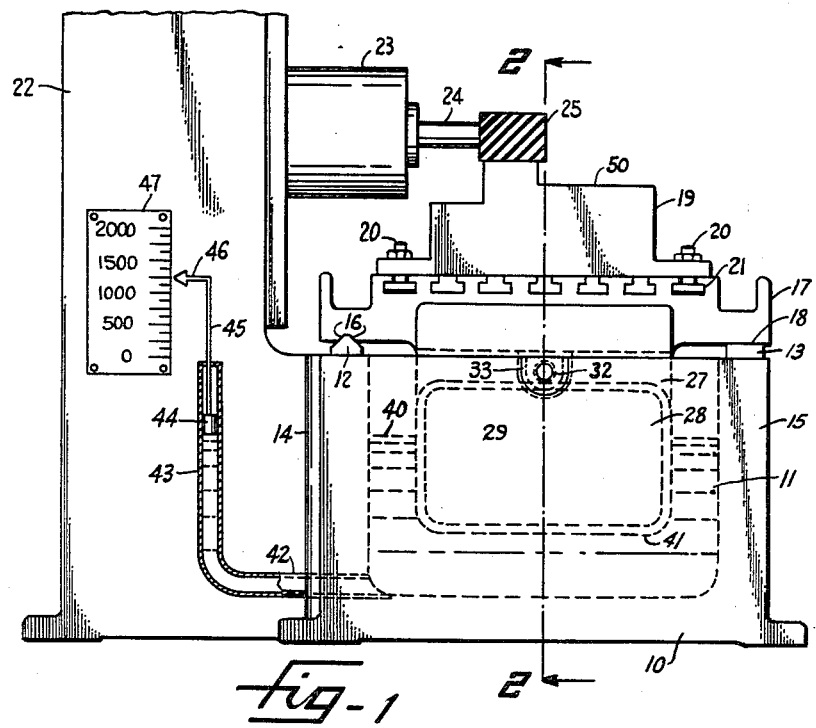

June 7, 1960

R. L. KELSO 2,939,369

MACHINE TABLE LOAD EQUALIZER

Filed Sept. 17, 1956

INVENTOR.
R. L. KELSO
BY
S. Tierney, Jr.
ATTORNEY

United States Patent Office 2,939,369
Patented June 7, 1960

2,939,369

MACHINE TABLE LOAD EQUALIZER

Robert L. Kelso, Chula Vista, Calif., assignor to Rohr Aircraft Corporation, Chula Vista, Calif., a corporation of California Filed Sept. 17, 1956, Ser. No. 610,282

3 Claims. (Cl. 90—58)

In machine tools in which the workpiece is brought against a cutter to remove material therefrom as, for example, horizontal and vertical milling machines, planers, shapers, and other machines of this type, the workpiece is supported by a table which travels back and forth on straight guideways or ways on the stationary bed of the machine. For machining large heavy workpieces the table must be large and often a large fixture or clamp of some type must be secured to the table to anchor the workpiece so that it cannot move with reference to the table.

Due to the weight of the table and the members supported thereby, a large downward pressure which may reach several tons is applied to the ways. This pressure causes progressive wear on the ways and the portions of the table in contact therewith so that after a period of time the ways are no longer straight with the result that the workpiece is not moved in a rectilinear path against the cutting tool and is improperly cut. It is a main object of my invention to greatly decrease this downward pressure on the ways or to eliminate it entirely. This reduction in downward pressure not only greatly reduces the wear on the ways and table but results in a saving of power in the power feeding mechanism used to move the table along the ways. This will be clear when it is considered that the friction between the table and ways is proportional to the downward pressure of the table on the ways so that a reduction in this pressure results in decreased friction and a corresponding saving in the power needed to overcome this friction in moving the table.

Another object is to secure this reduction in pressure on the ways by providing a float member integral with or connected to the travelling table and a pool of liquid in which the lower portion of said member is constantly submerged whereby the buoyant force of the fluid is applied in an upward direction to the table and tends to lift the table off the ways.

Sometimes a workpiece has to be machined which is non-symmetrical and much heavier at one end than the other. In this case the pressure on the ways under the heavy end of the workpiece will be much greater than that under the lighter end thereof. A further object of the invention is to equalize the pressure on the ways by making the float hollow and providing a transverse bulkhead therein. By putting liquid into the compartment of the float under the lighter end of the workpiece the pressure on the ways can be equalized.

In machines where the space in the bed to hold a pool of liquid is limited in size, it is a further object of the invention to secure a large buoyant force by providing a liquid whose specific gravity is substantially greater than 1.0 as, for example, mercury.

Figure 2:
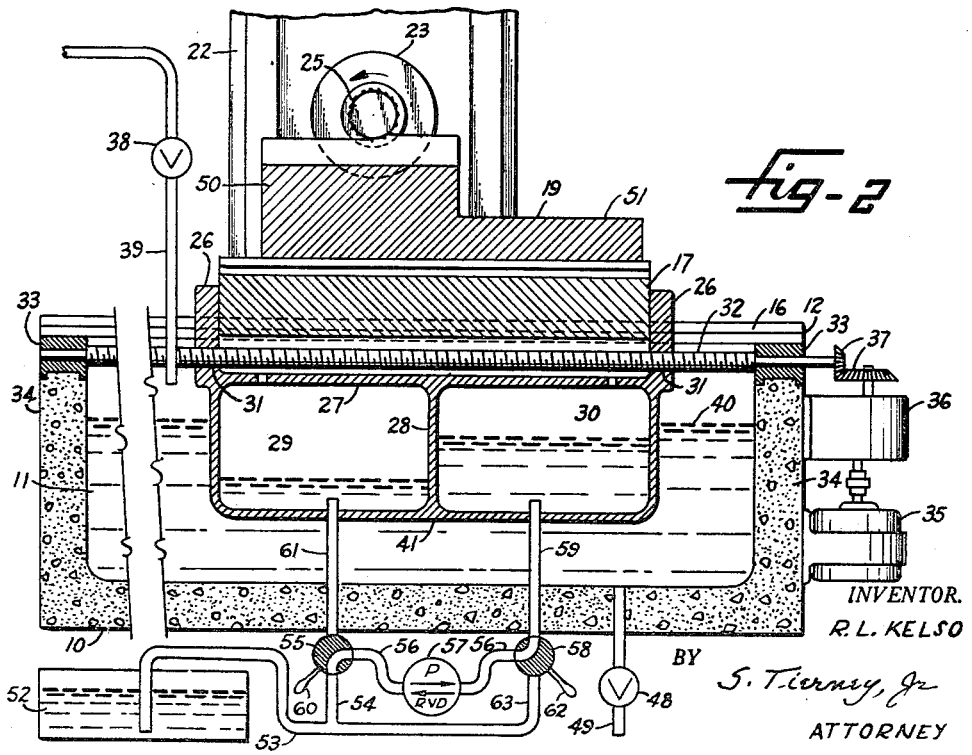

Further objects will become apparent as a description of the machine proceeds. For a better understanding of the invention reference is made to the accompanying drawings, in which:

Fig. 1 is an end view, partly in section, of a milling machine embodying the invention and, Fig. 2 is a view of the machine partly in section on line 2—2 of Fig. 1 and partly diagrammatic.

The machine shown comprises a generally rectangular hollow base 10 adapted to rest on the floor and to hold a pool of liquid 11 which may be water or a liquid having a specific gravity substantially greater than 1.0 such as mercury. Base 10 may be made of reinforced concrete or other material impervious to the passage of liquid. A pair of metal guides or ways 12, 13 are anchored to the tops of the sides 14, 15 of base 10, the ways being made of steel or other hard metal. Way 12 is provided with a pair of long straight inclined faces 16 which contact a pair of similar faces cut in the bottom of table 17. The top face 18 of way 13 is flat and contacts a flat face machined on the bottom of table 17 near the side thereof. Any suitable means may be used to secure the workpiece to table 17, that illustrated being a plurality of bolts 20 having large heads 21 which fit in inverted T shaped slots in the top of table 17. Fastened to wall 14 is a vertical metal column 22 having a cylindrical arbor 23 which rotatably supports a shaft 24 to the end of which a milling cutter 25 is secured. Any known type of power drive (not shown) may be used to rotate shaft 24.

Attached by bolts or welds (not shown) to the ends of table 17 are the upper portions 26 of a metal float or tank 27 having a transverse partition 28 subdividing the tank into two watertight compartments 29, 30. To reciprocate table 17 along the ways 12, 13, the tank wall portions 26 are provided with threaded holes 31 which receive a threaded shaft 32 whose ends are journaled in metal bearings 33 anchored to the end walls 34 of base 10. Shaft 32 can be rotated in either direction by a reversible electric motor 35 through a gear reducer 36 and a pair of meshing bevel gears 37. Water or other liquid 11 may be run into base 10 to any desired level by opening a valve 38 in a pipe 39 whose upper end is connected to a source (not shown) of the liquid.

To cut material from the top of a workpiece which is symmetrical about a plane through its center, no liquid need be put in tank 27. In this case it will be clear that a downward pressure will be imposed on the ways 12—13 equal to the weight of the workpiece plus the weight of table 17 plus the weight of tank or float 27. In large machines the workpiece often weighs 2,000 pounds or more so that the total pressure on the ways 12—13 may amount to 4,000 pounds or more. This continued downward pressure on the bearing faces 16 and 18 of the ways causes continual wear of these faces and of the portions of table 17 in sliding contact therewith as the table is advanced along the ways toward the cutter 25 to make the cut and in the opposite direction on the return stroke. The downward pressure also sets up a large friction force between table 17 and bearing faces 16 and 18 which must be overcome by power supplied by motor 35. These disadvantages may be overcome by opening valve 38 and discharging liquid into hollow base 10 until the top surface 40 of the liquid is higher than the bottom face 41 of tank 27 by an amount sufficient to produce an upward buoyant force on tank 27 which is equal to the normal downward pressure on the ways. If the operator does not wish to relieve the entire downward pressure on the ways, he will run somewhat less liquid into base 10 to provide a somewhat smaller buoyant force.

To provide means for visually indicating to the operator the amount of upward buoyant force exerted on the table by different amounts of liquid in base 10, a tube 42 extends through wall 14 near the bottom thereof, this tube connecting with a vertical cylindrical tube 43 having a smooth inner surface along which slides a float 44 resting on the liquid in tube 43. A thin rod 45 is attached to the float and the top of this rod carries an indicator 46 which is movable along a graduated scale 47 detachably connected to column 22. The scale is preferably graduated in pounds and indicates the buoyant force of the liquid 11 applied to table 17 for different levels of liquid surface 40. If instead of using water in bed 10 and tubes 42, 43, mercury is used instead, scale 47 will be replaced by a scale in which each division represents about 13.6 times as many pounds as a division of the scale for water. This follows for the reason that the density of mercury is approximately 13.6 and the buoyant force of a fluid is proportional to its density. If the operator wants to decrease the buoyant force applied to tank 27 and table 17 at any time, he opens a valve 48 connected to an outlet pipe 49 extending through the bottom of base 10 and permits liquid to run out until the desired buoyant force is secured as indicated on scale 47.

If one end 50 of workpiece 19 is larger and heavier than its smaller end 51, as illustrated, the downward pressure on the portions of way bearing faces 16 and 18 under the heavier end 50 will normally be greater than the pressure on the portions of these faces under the lighter end 51. Such an uneven distribution of pressure on the ways is undesirable and may be overcome by pumping enough liquid into tank compartment 30 to equalize the pressure on the ways. For this purpose a liquid supply system is schematically shown in which liquid is transferred from a source 52 via pipes 53, 54, valve 55, pipe 56, pump 57, valve 58 and pipe 59 into compartment 30. At times it may be necessary to reverse the workpiece so that its heavy end comes over compartment 30. In this case some or all of the liquid is transferred from compartment 30 into compartment 29. This is effected by reversing the direction of rotation of pump 57 and rotating valve 55 by its handle 60 so that it connects pipes 56 and 61 if additional liquid from source 52 should be needed in compartment 29, valve 55 would be left set connecting pipes 56 and 61 and valve 58 rotated by its handle 62 through 90° so that it connects pipes 63 and 56. With both valves left set in the positions last mentioned, by merely reversing the direction of rotation of pump 57, it will be clear that liquid may be withdrawn from compartment 29 and pumped into source 52. The liquid system described thus permits the pressure on the ways due to the weight of non-symmetrical workpieces to be equalized and then reduced by any desired amount by utilizing the buoyant force of liquid pool 11.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A machine for severing material by a tool from a workpiece having a light end and a heavy end comprising: a long heavy table having a pair of long spaced apart bearing faces; means for securing the workpiece to said table with said heavy end of said workpiece over one end of said table and said light end of said workpiece over the other end of said table; a pair of long straight ways in contact with said bearing faces to slidingly support said table; means for moving said table along said ways to advance said workpiece against said tool; and hydraulic means for greatly decreasing the total pressure on said ways and also substantially equalizing the pressure thereon, said hydraulic means comprising a pool of liquid under said ways; a hollow float attached to said table and having its lower end continually submerged in said liquid, said float having a solid watertight bulkhead extending transversely to said ways to divide said float into a first watertight compartment having a first body of liquid disposed under said heavy end of said workpiece and a second watertight compartment having a second body of liquid heavier than said first body of liquid and disposed under said light end of said workpiece.

2. A machine for severing material by a tool from a workpiece having a light end and a heavy end comprising: a long heavy table having a pair of long spaced apart straight bearing faces; means for securing said workpiece to said table with said heavy end of said workpiece over one end of said table and said light end of said workpiece over the other end of said table; a pair of long straight ways in contact with said bearing faces to slidingly support said table; means for moving said table along said ways to advance said workpiece against said tool; and hydraulic means for greatly decreasing the total pressure on said ways and also substantially equalizing the pressure thereon, said hydraulic means comprising a hollow float depending from said table, said float having a solid watertight bulkhead extending transversely to said ways to divide said float into a first watertight compartment under said heavy end of said workpiece and a second watertight compartment under said light end of said workpiece; bodies of liquid within both of said compartments and also surrounding said float, the surface of the liquid in said second compartment being above the surface of that in the first compartment but below the surface of the liquid surrounding the float.

3. A machine for severing material from an unsymmetrically weighted workpiece by a tool comprising: a hollow base having a pool of liquid therein; a table having means for securing said workpiece thereon in relation to said tool; means for slidingly supporting said table on said base; means for moving said table along said slide support means to advance said workpiece against said tool; hollow float means secured to said table and buoyantly supported in said liquid thereby to provide an upwardly directed buoyant force on said table to partially reduce the downwardly directed pressure on said slide support means due to the weight of said table and tool thereon, said float means having liquid tight compartments for individually receiving liquid therein to thereby vary the buoyant force produced by the portion of said float means individual thereto, said compartments being disposed respectively under different weighted portions of said workpiece; and means for transferring liquid between said compartments to compensate for the unsymmetrical weighting of said workpiece relative to said slide support means.

References Cited in the file of this patent

UNITED STATES PATENTS

| | | |
|---|---|---|
| 1,000,152 | Correll | Aug. 8, 1911 |
| 1,849,730 | Morse | Mar. 15, 1932 |
| 1,922,882 | Chatfield | Aug. 15, 1933 |
| 2,679,759 | Gilmont | June 1, 1954 |
| 2,787,175 | Schurger | Apr. 2, 1957 |

OTHER REFERENCES

| | | |
|---|---|---|
| 57,047 | France | Jan. 14, 1863 |